MOBILE AERIAL TOWER

Filed Jan. 13, 1965

10 Sheets-Sheet 1

INVENTORS
CURTIS W. VERRELL
JAMES H. HOLAN
BY
Teare, Fetzer & Teare
ATTORNEYS

Jan. 31, 1967 C. W. VERRELL ET AL 3,301,346

MOBILE AERIAL TOWER

Filed Jan. 13, 1965 10 Sheets-Sheet 2

INVENTORS
CURTIS W. VERRELL
BY JAMES H. HOLAN

Teare, Fetzer & Teare
ATTORNEYS

INVENTORS
CURTIS W. VERRELL
BY JAMES H. HOLAN
Teare, Fetzer & Teare
ATTORNEYS

INVENTOR.

CURTIS W. VERRELL
JAMES H. HOLAN
BY Teare, Fetzer & Teare
ATTORNEYS

MOBILE AERIAL TOWER

Filed Jan. 13, 1965

INVENTORS
CURTIS W. VERRELL
BY JAMES H. HOLAN
Teare, Fetzer & Teare
ATTORNEYS

Jan. 31, 1967 C. W. VERRELL ET AL 3,301,346

MOBILE AERIAL TOWER

Filed Jan. 13, 1965 10 Sheets-Sheet 6

INVENTORS
CURTIS W. VERRELL
JAMES H. HOLAN

BY Teare, Fetzer & Teare

ATTORNEYS

MOBILE AERIAL TOWER

Filed Jan. 13, 1965

INVENTORS
CURTIS W. VERRELL
BY JAMES H. HOLAN
Teare, Fetzer & Teare
ATTORNEYS

INVENTORS
CURTIS W. VERRELL
BY JAMES H. HOLAN
Teare, Fetzer & Teare
ATTORNEYS

MOBILE AERIAL TOWER

INVENTORS
CURTIS W. VERRELL
JAMES H. HOLAN
BY Teare, Fetzer & Teare
ATTORNEYS

MOBILE AERIAL TOWER

Filed Jan. 13, 1965

10 Sheets-Sheet 10

INVENTORS
CURTIS W. VERRELL
BY JAMES H. HOLAN
Teare, Fetzer & Teare
ATTORNEYS

3,301,346
MOBILE AERIAL TOWER

Curtis W. Verrell, Fairview Park, and James Howard Holan, Rocky River, Ohio, assignors to The Ohio Brass Company, Mansfield, Ohio, a corporation of New Jersey Filed Jan. 13, 1965, Ser. No. 425,129
13 Claims. (Cl. 182—2)

This invention relates in general to a mobile aerial tower of an extensible type wherein the tower boom may be selectively extended and retracted for adjusting the operating range or reach of the tower, and more particularly to the control mechanism for the extensible tower, which can be operated to cause actuation of powered motor units, for positioning the mobile aerial tower and associated work platform structure on the outer end thereof, to selected positions.

The aerial tower of the invention is illustrated as being of a portable type mounted on a utility-type vehicle, and having a control system including controls for elevating, extending and rotating the tower, and a leveling system for the work platform associated therewith, extending through the generally hollow extensible boom of the tower. The leveling system is for maintaining the work platform level with respect to ground, irrespective of the angled position of the tower boom.

The control mechanism and the platform leveling mechanism extending through the extensible boom sections include control cables or lines extending along the boom and a pilot control unit coupled to the control cables and mounted adjacent the work platform structure, for selective and ready actuation by workmen on the platform, thus permitting such workmen to control the movement of the tower boom to any desired position. Such platform leveling system and control system does not inherently possess resiliency for extension and retraction during extension and retraction of the boom.

The present invention provides an automatic compensating means including a shiftable mechanism on the boom coacting with the control lines, for automatically compensating for the extension and retraction of the aerial boom during positioning of the tower and thus preventing rupture or slackening in the control and leveling systems.

Accordingly an object of the invention is to provide a novel extensible aerial tower.

Another object of the invention is to provide a novel extensible aerial tower having control mechanism mounted on the tower and including control lines extending along the boom and a pilot control unit mounted in conjunction with the work platform structure of the tower, for selective and positive actuation and control of a fluid powered system for controlling movement of the aerial tower to a variety of positions.

Another object of the invention is to provide an aerial tower of the above mentioned type which includes a work platform leveling system associated with the tower and extending therealong, for maintaining the work platform level irrespective of the angling movement of the tower.

Another object of the invention is to provide an aerial tower of the above mentioned type wherein the control system and the platform leveling system include compensating means including a shiftable carriage mechanism associated therewith, for compensating for the extension and retraction of the tower boom and thus extension and retraction of the control system and the platform leveling system.

A more specific object of the invention is to provide a novel aerial tower including a telescopically extensible boom, with a work platform pivotally mounted on the boom adjacent its distal end, and with the boom being pivoted to a support for angling movement with respect to the horizontal, and for rotational movement about a generally vertical axis, and wherein such tower and associated work platform is movable to various positions by a plurality of fluid actuated motor units, and including valve means for controlling the flow of actuating fluid to said motor units, and wherein there is provided a mechanical control system for operating the valve means from the work platform and a work platform leveling system for maintaining the work platform level with respect to the horizontal irrespective of the vertical angling movement of the tower boom, and wherein the control system includes a pilot control unit mounted adjacent the work platform of the aerial tower for actuation from the work platform and operatively connected to the valve means by means of flexible elements extending through the tower sections, and including shiftable means disposed interiorly of the tower boom and coacting with the flexible elements, for preventing slack and/or rupture of the control and leveling systems during extension and retraction of the tower boom.

Other objects and advantages of the invention will be apparent from the following description taken in conjunction with the accompanying drawings wherein.

Figures 1, 7:
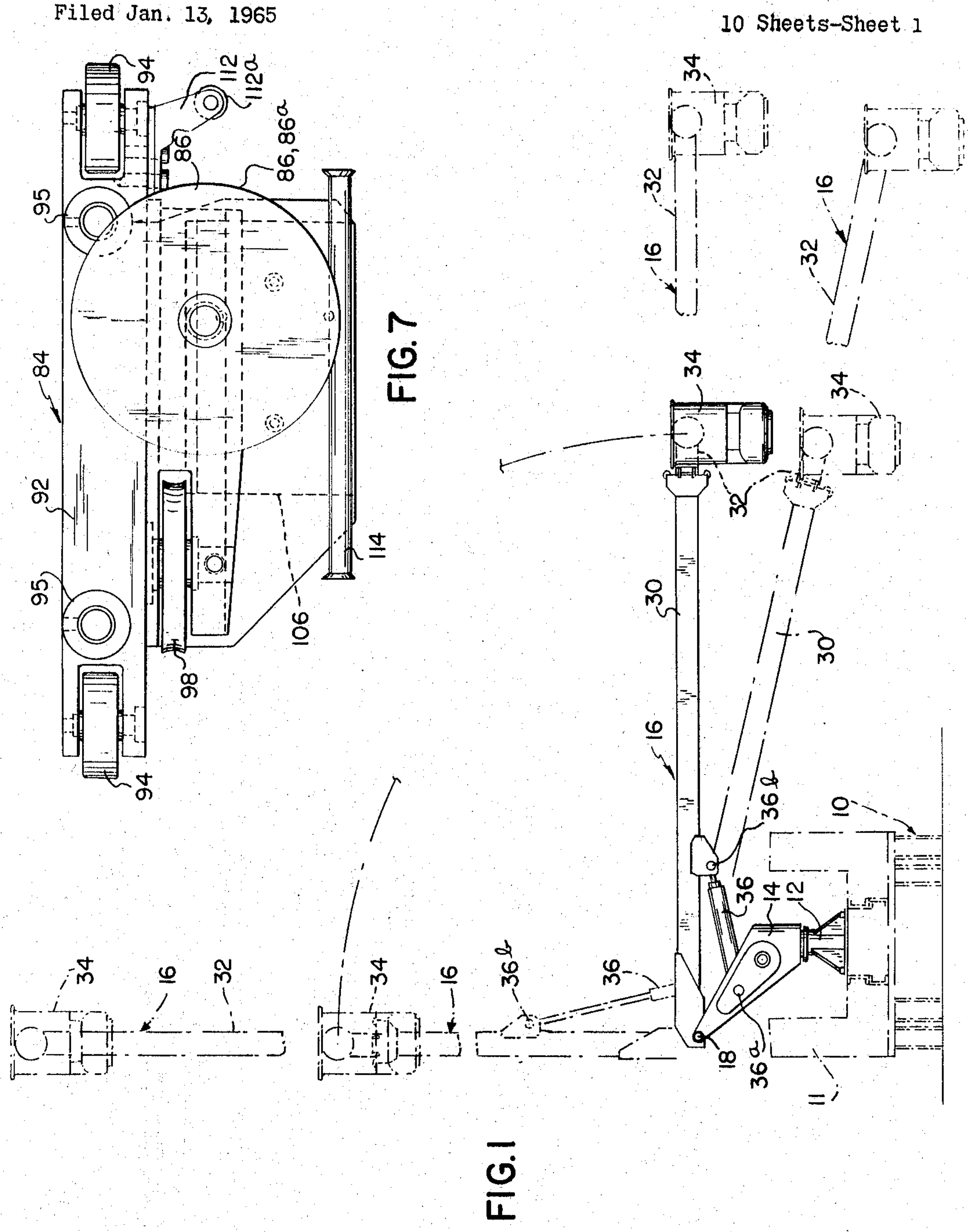
FIG. 1 is a generally diagrammatic illustration of the aerial tower of the invention mounted upon a truck body, and showing in phantom lines various extended and angled positions of the tower.
FIG. 7 is an enlarged, side elevational view of the carriage mechanism which coacts with the cable system and the platform leveling system for compensating for the extension and retraction of the tower boom sections.

Referring now again to the drawings, there is shown a wheeled utility vehicle 10 (FIG. 1) having a truck body 11 which carries a vertical mast or pedestal 12 on which is rotatably mounted a superstructure frame 14, which is preferably rotatable through 360°, and pivotally supports the extensible tower assembly 16 adjacent its upper extremity, as at 18. Rotation of superstructure frame 14 may be accomplished by means of a rotary, preferably reversible, fluid powered motor unit 20 (FIG. 2) mounted on the superstructure frame 14 and operably coupled by means of a chain and sprocket drive 22 to a worm gear 24 rotatably mounted on the superstructure frame, with the worm gear 24 engaging fixed gear 26 coupled to the pedestal. Upon actuation of the fluid powered motor unit 20, the worm gear 24 is caused to turn, thereby rotating the superstructure frame 14 about the vertical axis of the pedestal.

The tower assembly 16 may include an inner tower section 30, pivoted as aforementioned at 18 to the superstructure frame 14, and an outer tower section 32, disposed in telescoping relation with respect to the inner tower section, for movement lengthwise thereof, thus extending and retracting the tower boom. Roller means 33 (FIGS. 2A and 3) may be provided adjacent the outer end of the inner tower section 30, adapted for coaction with the outer tower section 32, and roller means 33*a* (FIG. 2) may be provided adjacent the inner end of outer tower section 32 adapted for coaction with the interior of the inner tower section 30, for guiding and facilitating the lengthwise movement of the outer tower section with respect to the inner section.

A work platform or workmen's bucket 34 may be pivotally supported adjacent the distal end of the outer tower section 32 for supporting workmen therein. While only one work platform has been illustrated in the drawings, it will be understood that a pair of work platforms could be readily provided on the outer end of the boom. The outer boom section 32 and the bucket 34 are preferably comprised of electrical insulating materials, such as fiberglass, so that the work platform is effectively electrically insulated from ground, so far as the boom structure per se is concerned.

A reciprocal, double acting fluid powered motor unit 36 may be provided, coacting between pivot 36*a* on the superstructure frame, and a pivot 36*b* on the inner boom section, for swinging the aerial tower in a generally vertical plane, and about horizontal pivot 18.

Another fluid powered, double acting, reciprocal motor unit 38 may be provided interiorly of the boom sections and coupled as at 38*a* (FIG. 2) to the inner boom section, and as at 38*b* (FIG. 2A) to the outer boom section, for selectively extending and retracting the tower boom sections with respect to one another, and thereby changing the position of the work platform. The motor unit 38 may be of the type illustrated in U.S. Patent No. 3,136,223 issued June 9, 1964 to John Barry Evans.

Figure 4:
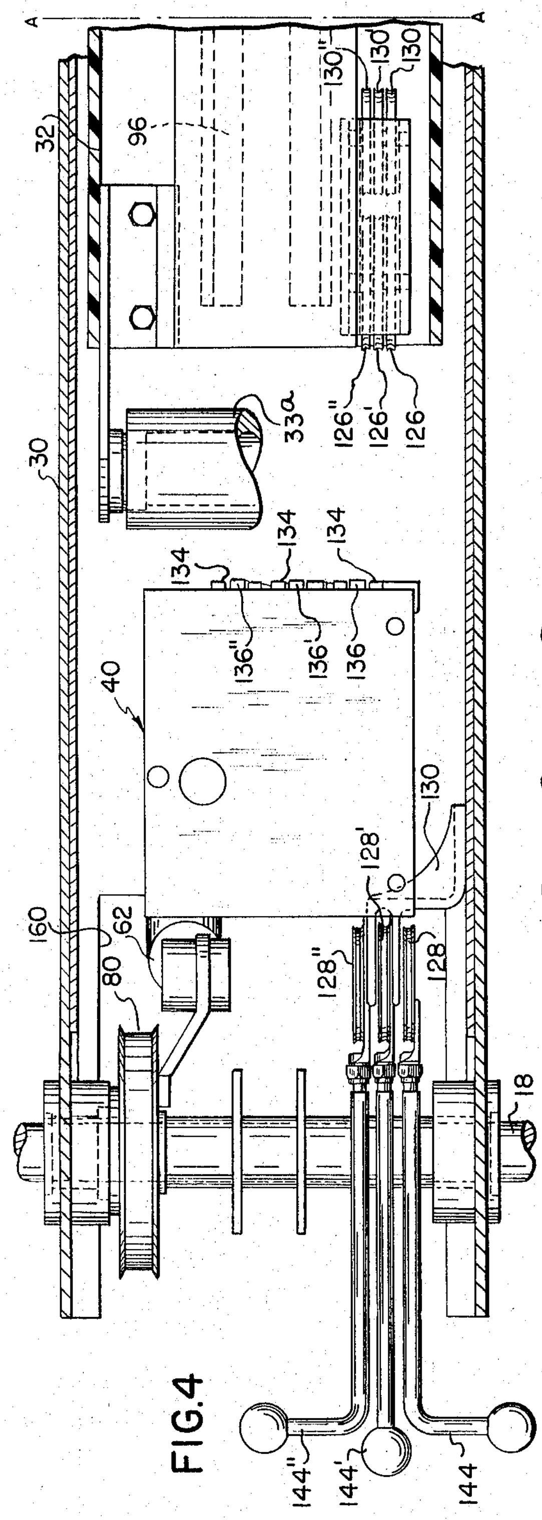
FIGS. 4, 4A and 4B represent partially broken, sectional, top plan views of the extensible tower boom, and illustrating in particular the control system extending through the boom sections.
Figure 5:
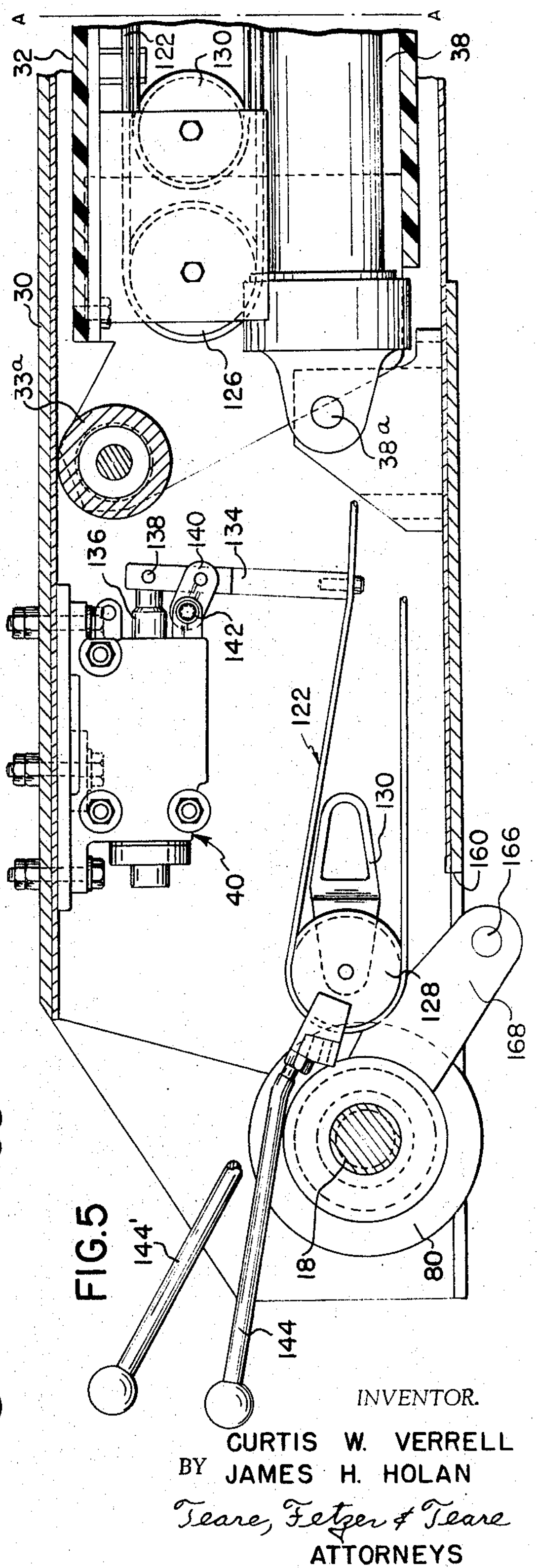
FIGS. 5, 5A and 5B are side elevational, sectional views of the mechanism illustrated in FIGS. 4, 4A and 4B respectively.
Figure 4A:
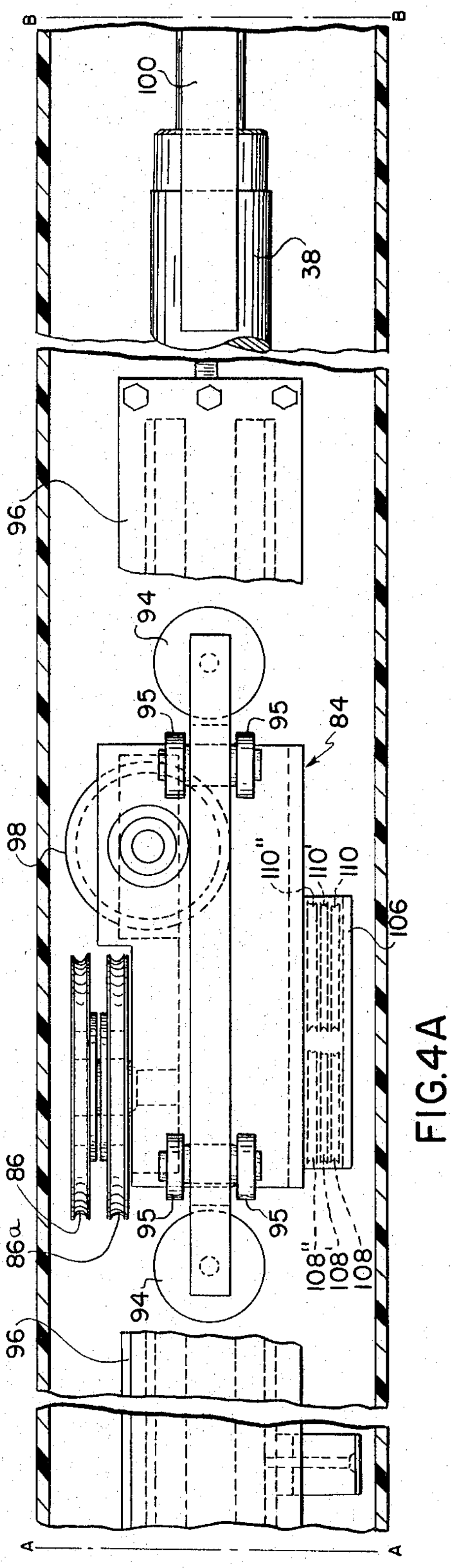
Figure 5A:
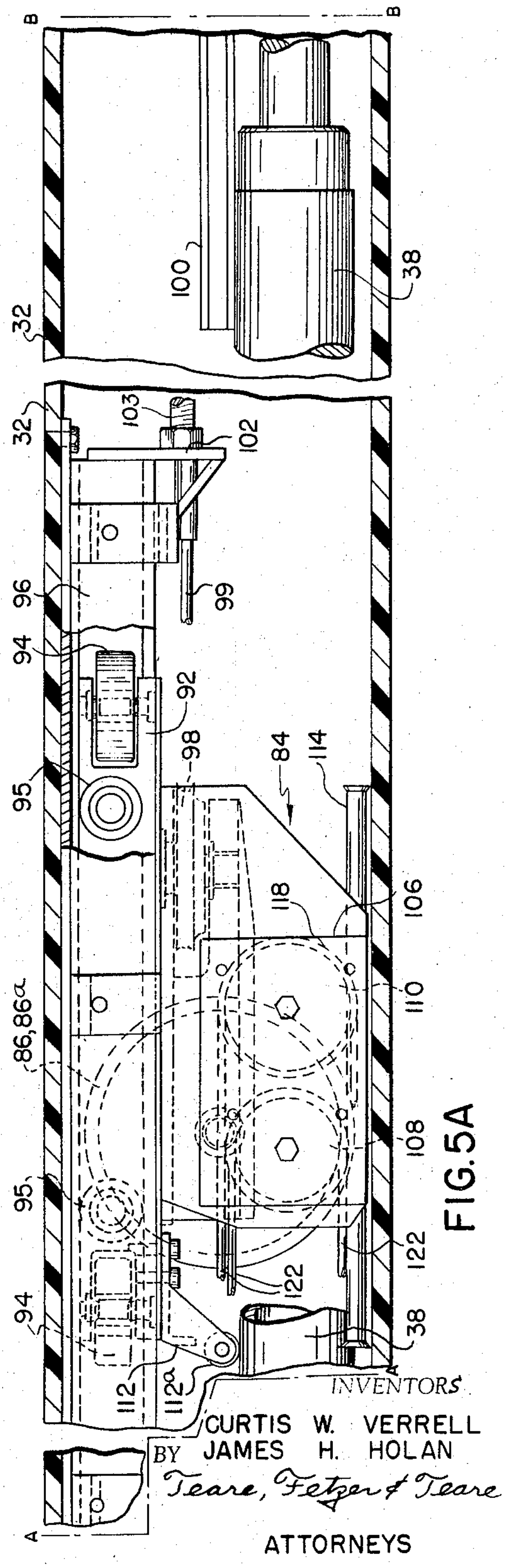
Figures 4B, 5B:
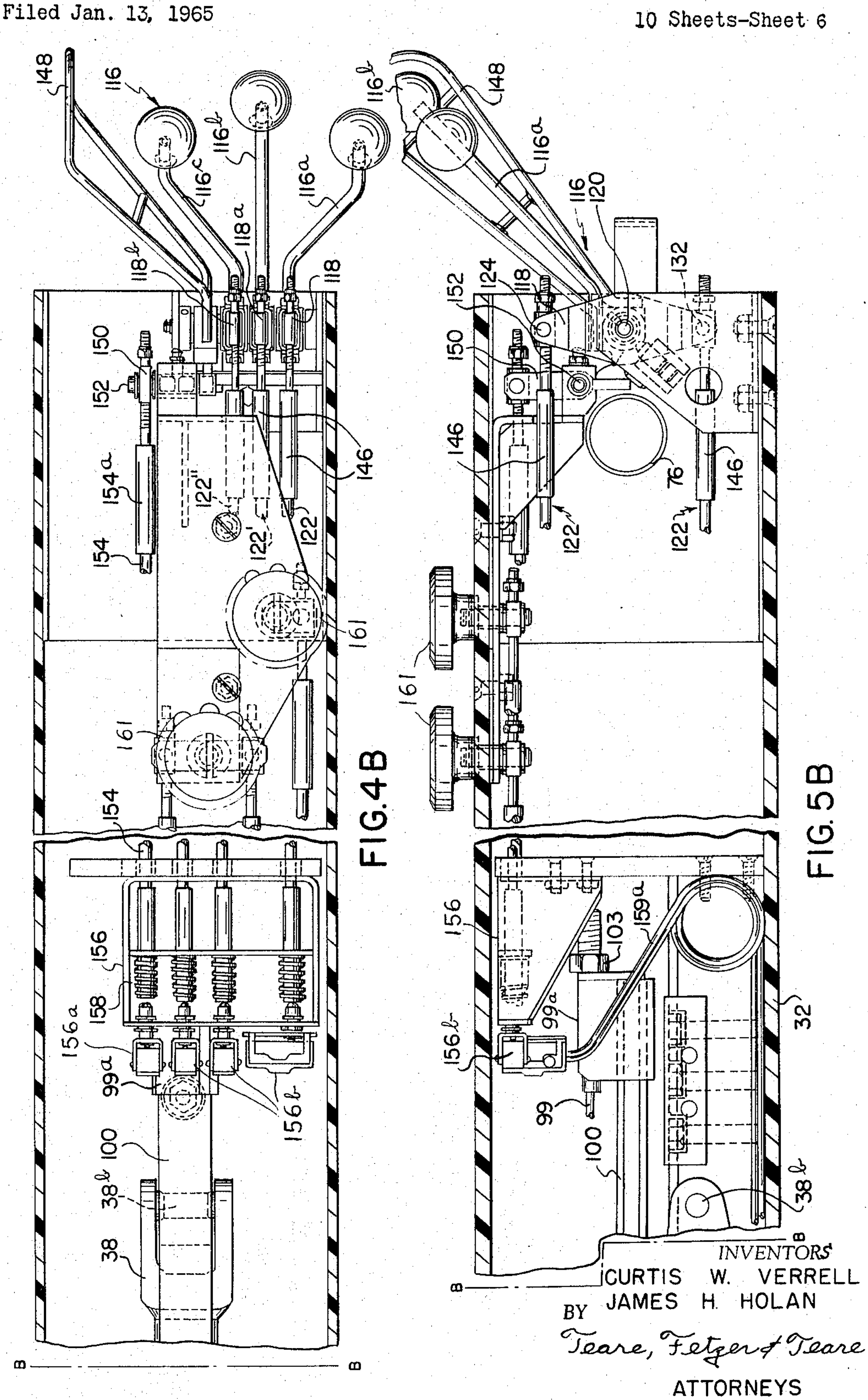
Figure 6:
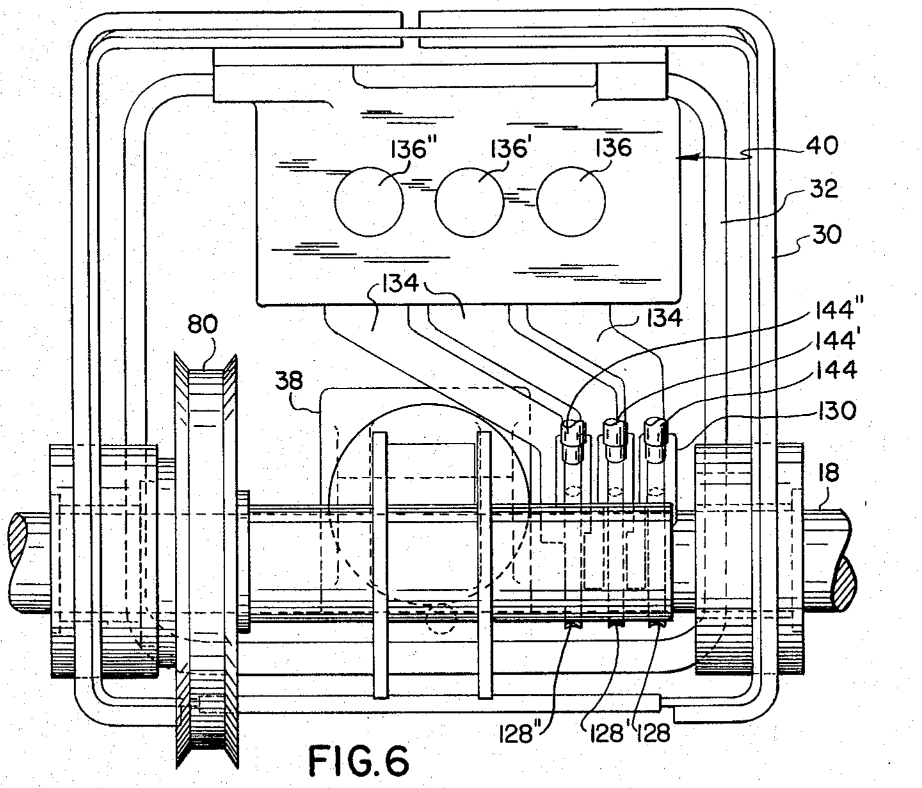
FIG. 6 is an enlarged end elevational view taken generally from the left hand end of FIG. 5.

Controlled operation of the tower to present the work platform structure to any desired work location, is accomplished by selectively applying operating fluid to each of the aforementioned fluid motors through a fluid power system, including fluid supply and fluid return lines. The supply of operating fluid to each of the fluid powered motor units may be selectively controlled by means of a main multistage distributor valve 40 (FIGS. 4 and 5).

Figures 10, 13:
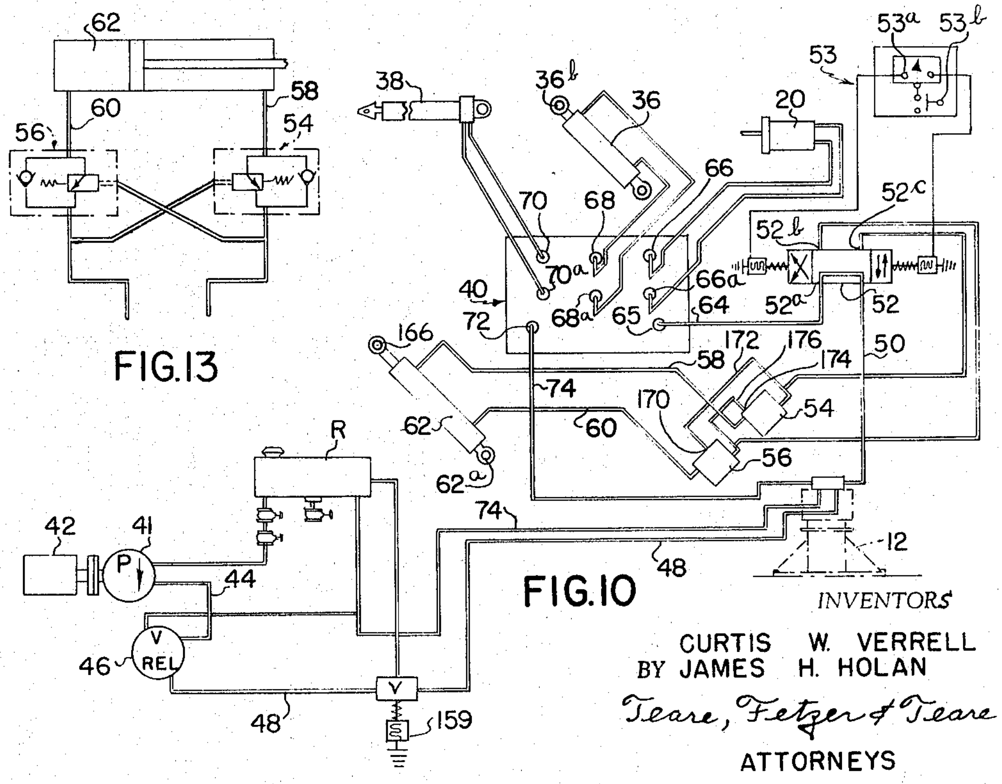
FIG. 10, is a diagrammatic and schematic illustration of a fluid system which may be utilized for actuating and controlling the movement of the aerial tower.
FIG. 13 is a schematic illustration of the fluid flow circuitry of the holding valves utilized for selectively pivoting the work platform and for platform leveling, in the FIG. 10 fluid system.

Referring now to FIG 10, the pump 41 of the fluid system may be selectively coupled to a power takeoff 42 on the conventional power unit of the utility vehicle, and supplies pressurized fluid for the system at, for instance, 2000 p.s.i. The fluid transmitting line 44 may run from the output port of the pump to relief valve 46, after which the fluid may travel via line 48 through the pedestal 12 of the aerial tower, and then via line 50 to solenoid valve 52. Valve 52 may be of conventional type adapted to ordinarily pass pressurized fluid therethrough and out exit port 52*a*, but which upon actuation thereof may apply pressurized fluid to one or the other of its distributing ports 52*b*, 52*c* while draining fluid into the other of said distributing ports. A valve identified as a 4-way tandem center, No. 1618–3–12V, manufactured by the Waterman Engineering Co. of Evanston, Illinois, has been found to be satisfactory. Valve 52 may be actuated to apply fluid pressure to one or the other of its distributing ports 52*b*, 52*c* by manual actuation of switch mechanism 53, preferably disposed in the cab of the utility vehicle. Actuation of two-way switch 53*a* in one direction together with actuation of switch 53*b* will cause application of pressurized fluid to one of ports 52*b*, 52*c* while actuation of switch 53*a* in the opposite direction will apply presurized fluid to the other of the ports.

Figure 2:
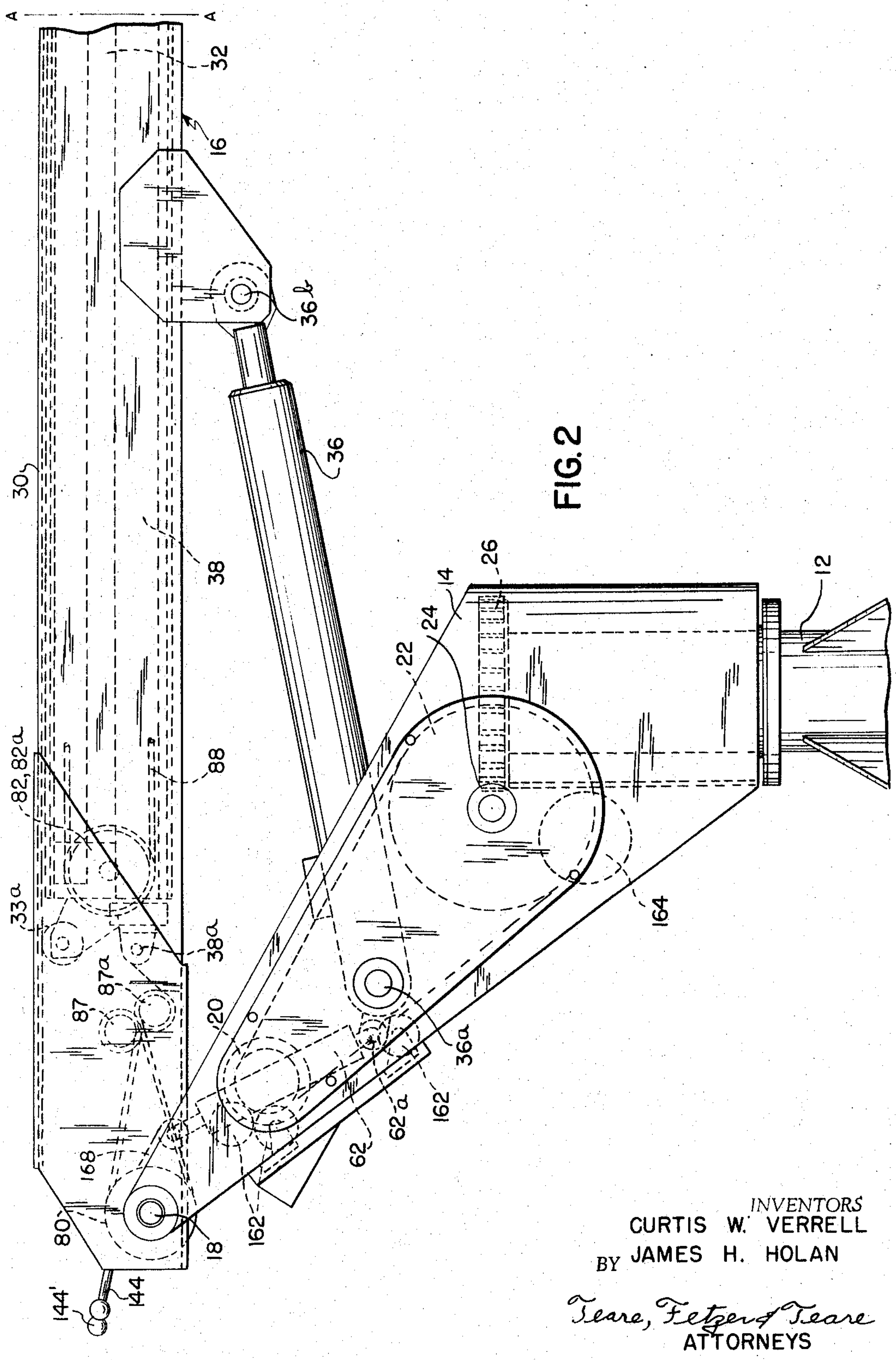
FIG. 2 is an enlarged side elevational, fragmentary view of the rearward portion of the aerial tower.

From the distributing ports 52*b*, 52*c* of solenoid valve 52, the fluid may flow to and from one or the other of the holding valves 54, 56 whereupon fluid is then transmitted via line 58 or 60 to the corresponding end of the work platform leveling piston and cylinder unit 62 (FIGS. 2 and 10), while the other line drains fluid from its respective end of the cylinder. Unit 62 may be mounted in the superstructure frame 14 and pivoted thereto as at 62*a* (FIG. 2). In this way, the bucket 34 may be swung about its pivotal connection to outer boom section 32, from the depending position illustrated for instance in FIG. 2A, to a generally parallel extending position for storage purposes, as will be hereinafter discussed in greater detail.

From exit port 52*a* of solenoid valve 52, the pressurized fluid flows via line 64 (FIG. 10) to inlet port 65 of the main distributing or control valve 40 which as aforementioned, may be of the open center, axially movable spool type, including a conventional pressure relief section embodied therein, for preventing excessive pressure in the hydraulic system controlled by the valve 40. The distributing ports 66, 66*a* in the distributing valve 40 may be coupled by fluid lines to the rotary motor unit 20 for rotating the superstructure framework 14, and thus rotating the aerial tower about a generally vertical axis, while distributing ports 68, 68*a* of the valve may be coupled to the lift cylinder 36 which is adapted to angle the aerial tower in a generally vertical plane and about the generally horizontally extending axis 18. Distributing ports 70, 70*a* in the control valve 40 may be coupled to the motor unit 38 which provides for extending and retracting the telescopic boom of the aerial tower. Exit port 72 of the valve may be coupled via line 74 back to the reservoir R, which may be located on the pedestal 12 of the tower, or elsewhere on the vehicle.

Figures 2A, 11, 12:
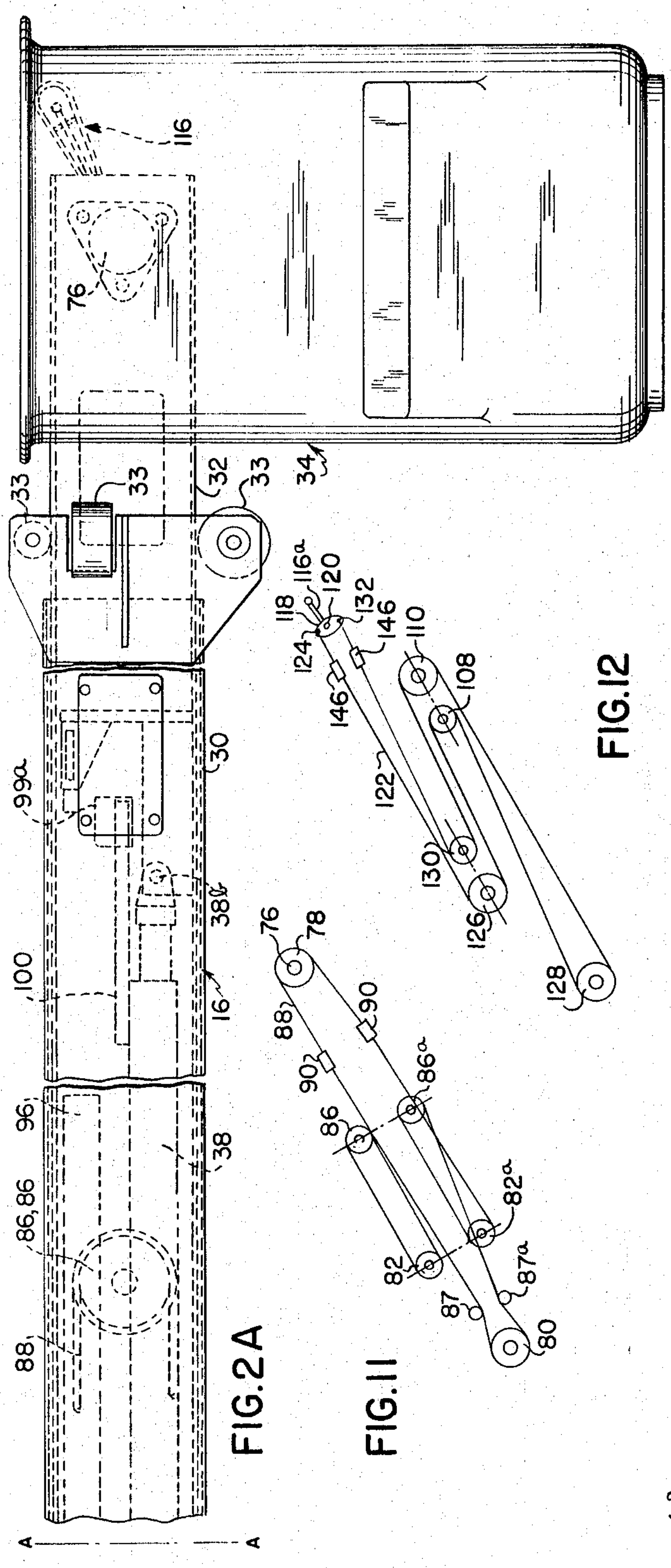
FIG. 2A is an enlarged, fragmentary, side elevational view of the forward portion of the tower including the work platform.
FIG. 11 is a diagrammatic illustration of the stringing of the platform leveling system.
FIG. 12 is a diagrammatic illustration of the stringing of one of the controls of the tower control system.
Figure 3:
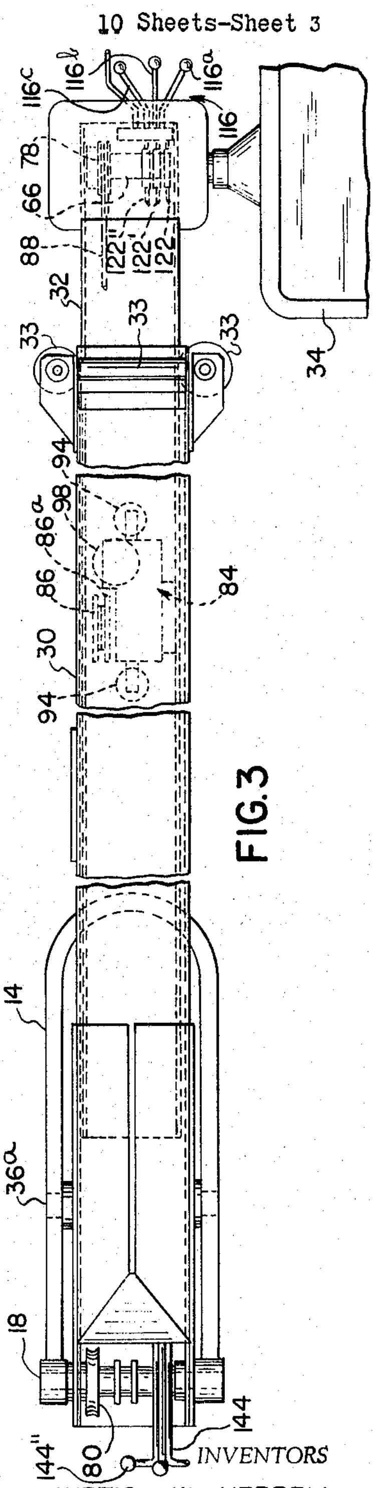
FIG. 3 is a reduced size, broken, top plan view of the aerial tower of FIGS. 2 and 2A.
Figure 8:
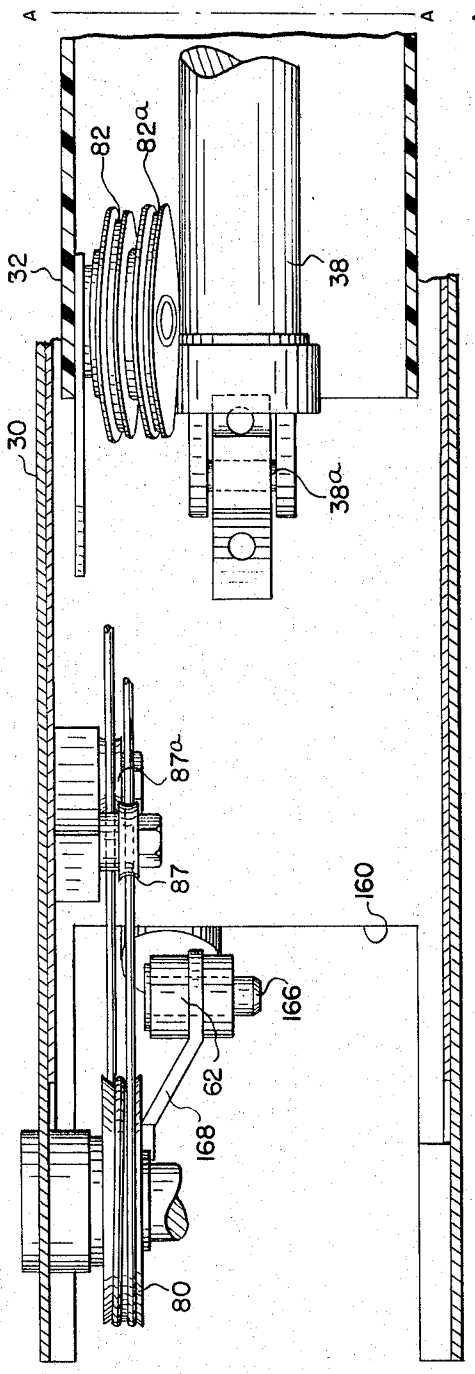
FIGS. 8, 8A and 8B are sectional, partially broken, top plan views of the tower boom sections, and showing in particular the work platform leveling system which extends through the tower sections.
Figure 9:
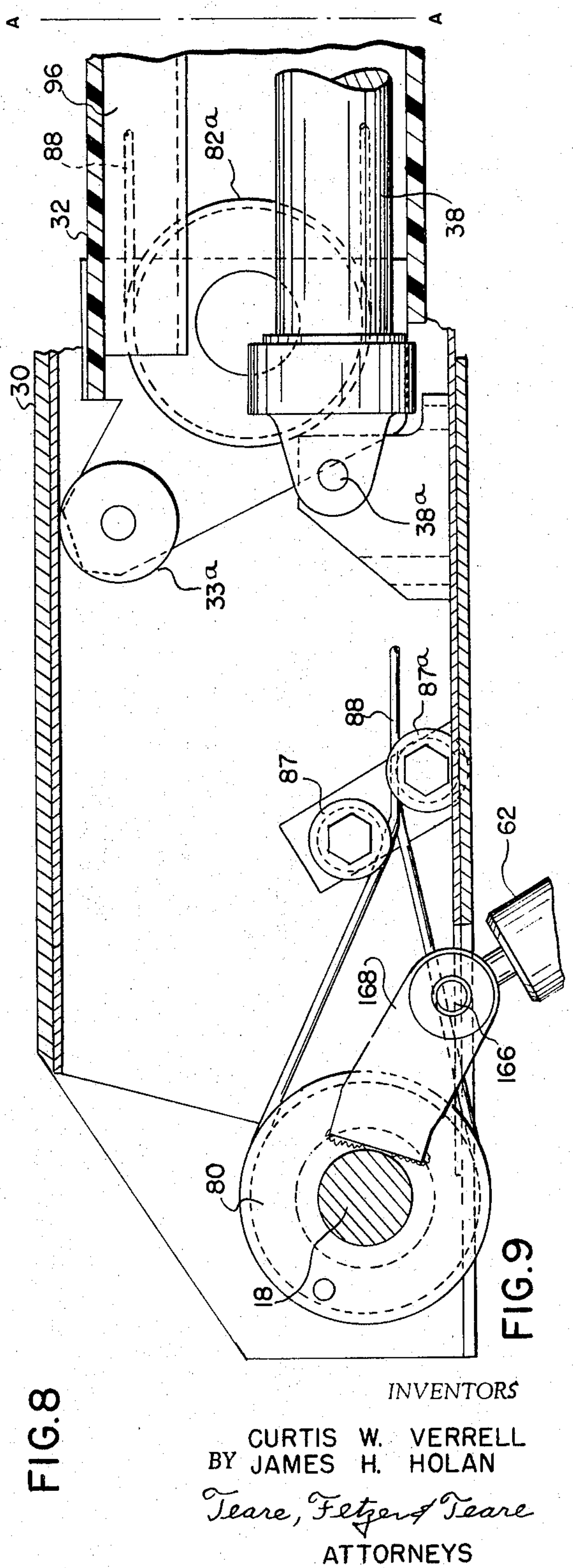
FIGS. 9, 9A and 9B are sectional, side elevational views of the tower sections with the work platform leveling system shown in FIGS. 8, 8A and 8B, respectively.
Figure 8A:
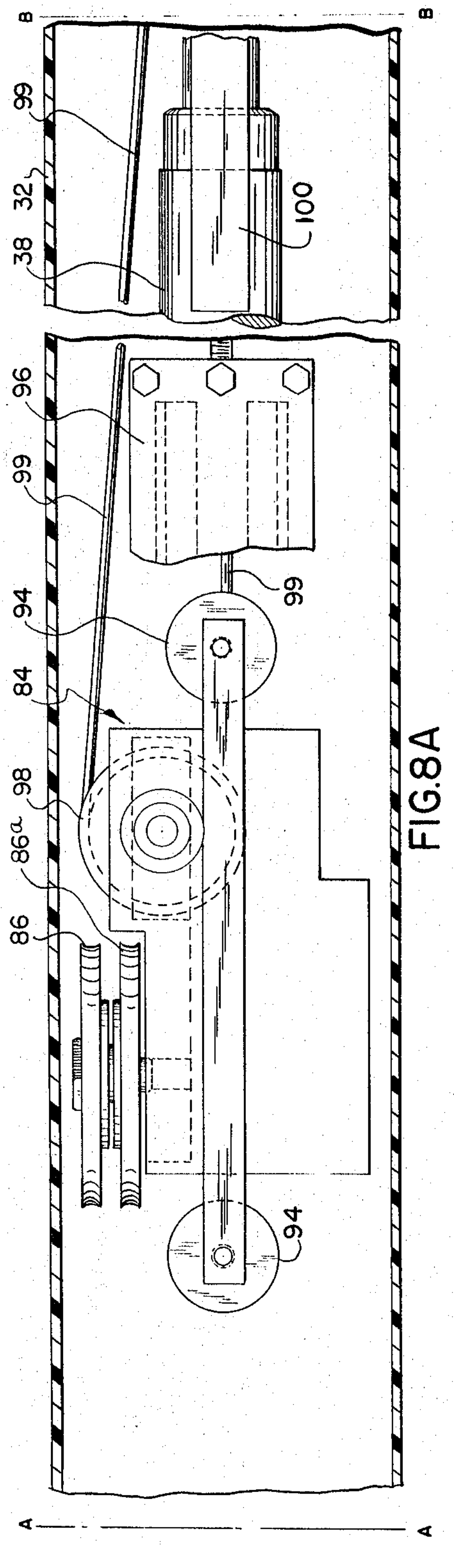
Figure 9A:
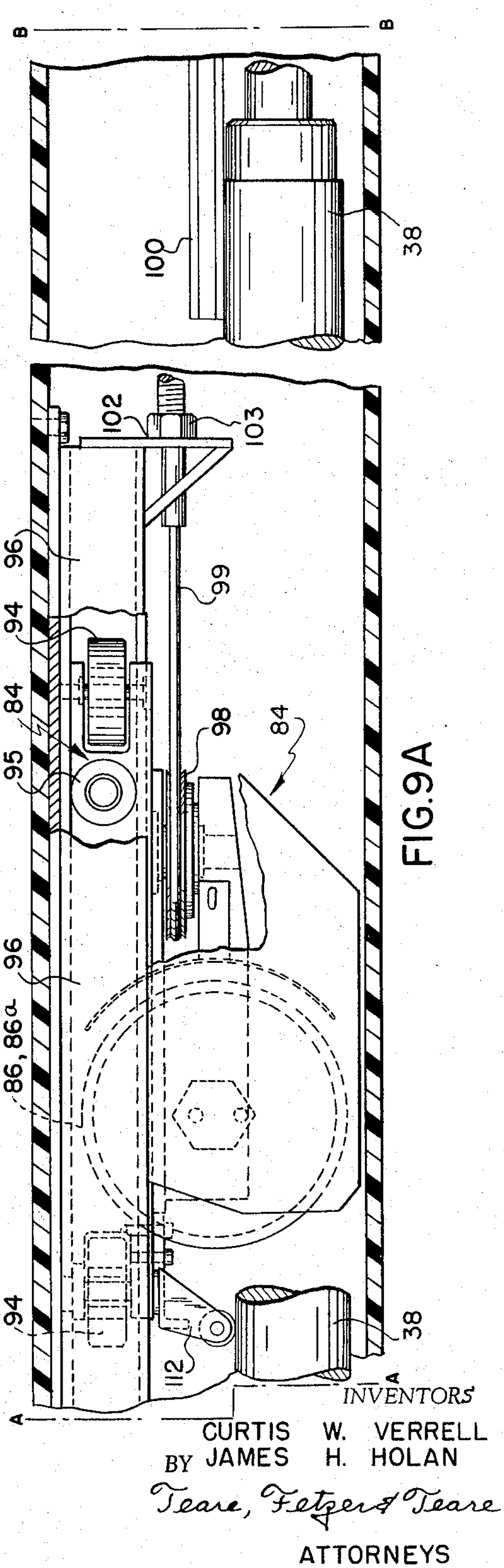
Figure 8B:
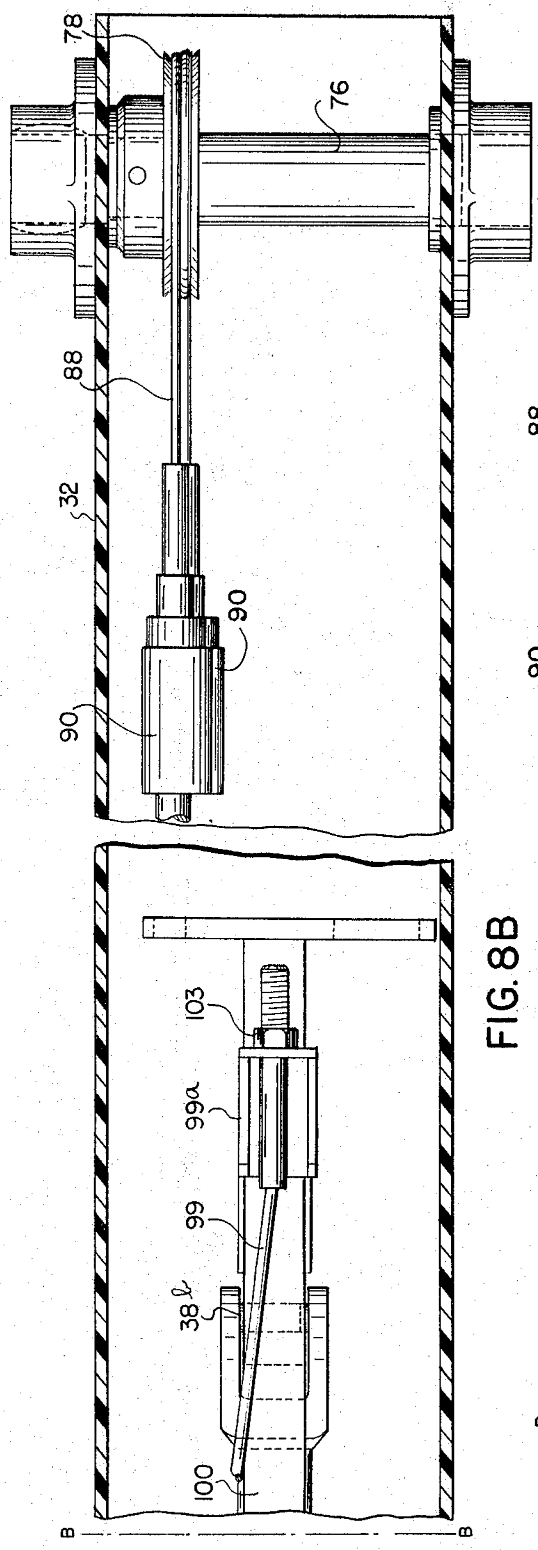
Figure 9B:
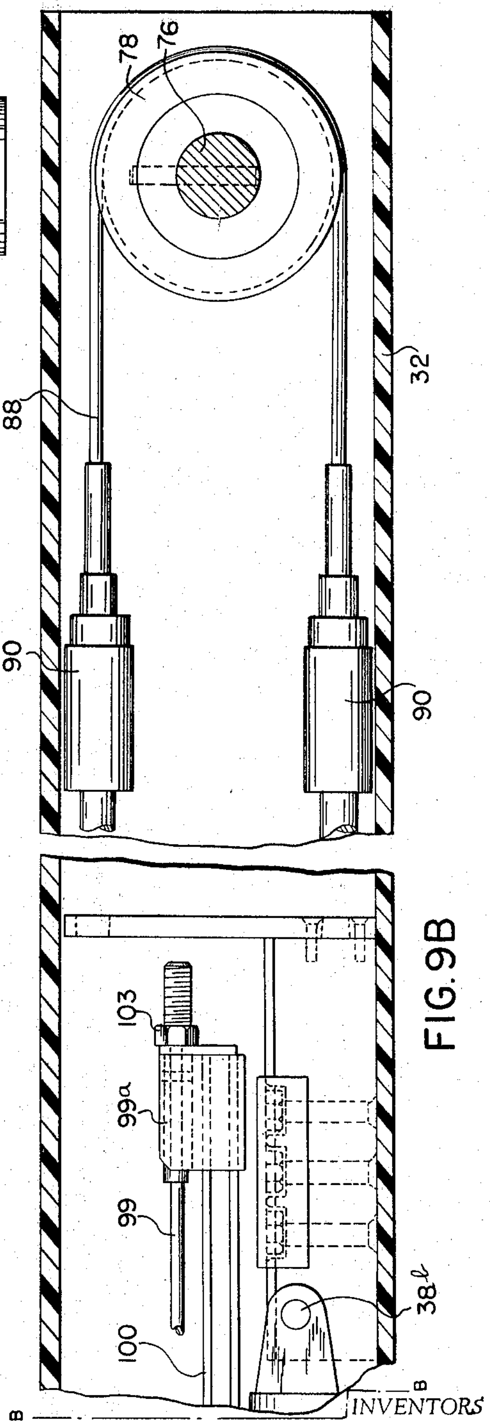

The platform leveling system for leveling the work platform 34 suspended on the outer end of the outer boom section 32 may embody the following: The work platform 34 may be pivotally mounted on boom section 32 by shaft 76 secured to the work platform and extending transversely of the outer boom section (FIG. 8B). Secured to the shaft 76 may be a sheave member 78 (FIGS. 8B, 9B and 11) and rotatably mounted adjacent the proximate end of the aerial tower boom is another rotatable sheave member 80 (FIGS. 8, 9, and 11). Rotatably mounted on the outer tower section 32 adjacent the inner end thereof and in spaced relation to sheave 80 may be a pair of laterally oriented sheave members 82, 82*a*. Spaced outwardly from sheaves 82, 82*a* toward the distal end of the boom, and rotatably mounted on a carriage mechanism 84 (FIGS. 7, 4A, 5A, 8A and 9A), which is adapted for reciprocal movement interiorly of the boom, may be another pair of rotatable sheave members 86, 86*a*. A flexible element or cable 88 may be looped about sheave 78 in nonslippable relation and then may extend rearwardly to be looped about sheave 82, and then may extend forwardly to be looped about sheave 86 mounted on carriage 84. After looping about sheave 86, the leveling cable may extend rearwardly and pass under pulley or guide 87 to be looped about sheave 80, in nonslippable relation and then may extend forwardly over guide pulley 87*a* to be looped about sheave 86*a* rotatably mounted on the carriage mechanism 84, and then may extend rearwardly to be be looped about sheave 82*a* on the outer boom section, and then may extend forwardly to sheave 78. Insulating elements 90 of fiberglass or the like (FIGS. 8B, 9B) are preferably installed in line 88 so that the entire leveling cable system is insulated from ground.

Referring now to the aforementioned carriage mechanism 84, the latter may comprise a frame 92 (FIGS. 4A, 5A and 7) which may include forward and rearward horizontally oriented rollers 94 and vertically oriented rollers 95 adapted for guiding and supporting coaction with tunnel-like track means 96 mounted on the boom section 32, so that the carriage can move lengthwise of the tower boom during extension and retraction thereof. Rotatably mounted on carriage 84 is a generally horizontally oriented sheave 98 which has a flexible member or cable 99 looped thereabout, with one end of the cable 99 being there coupled as at 99*a* to an extension rod 100 secured to the extension cylinder 38 of the aerial tower, and with the other end of the cable 99 being anchored as at 102 (FIG. 9A) to the outer boom section 32. Suitable means such as threaded fitting and associated nut 103 may be provided for tightening cable 99. Thus upon actuation of motor unit 38 to extend the outer boom section 32, the cable 99 coacting with rotatable pulley or sheave 98 will cause the carriage mechanism 84 to be moved forwardly on its track means 96, and a distance approximately one-half the distance of movement of the outer boom section 32. Upon retraction of motor unit 38, the pulleys 82, 82*a* on the boom section 32 coacting with the cable 88 and pulleys 86, 86*a* on the carriage 84 move the latter rearwardly on the track means 96, thus maintaining the leveling and control system cables in nonslacked condition, while permitting extension and retraction thereof with extension and retraction of the tower boom.

Carriage mechanism 84 also comprises a depending housing section 106 (FIGS. 4A, 5A and 7) which rotatably mounts pulleys or sheaves 108, 108′ and 108″, and pulleys 110, 110′ and 110″ therein for a purpose to be hereinafter discussed. Bracket 112 (FIG. 5A) may also depend from the rearward end of the carriage frame 92 and rotatably mount roller 112*a* thereon which is adapted for rolling coaction with the cylinder of motor unit 38 during shifting movement of the carriage inside the boom. A hollow tube 114 may be secured to the inner side of housing 106 for forming a passageway for electrical conduit extending along the boom.

Referring now in particular to FIGS. 4 through 5B, 7 and 12, the control system for controlling the actuation of fluid powered motor units 20, 36 and 38 may embody the following: A pilot control unit 116 (FIGS. 4B and 5B) including control levers 116*a*, 116*b* and 116*c* may be operably mounted on the outer boom section 32 in accessible proximity to the work platform or bucket 34, for actuation by a workman in the bucket. Each of levers 116*a*, 116*b* and 116*c*, is secured to a respective bracket 118, 118*a*, 118*b*, which in turn is pivoted to a transverse shaft 120.

One end of flexible means or cable 122 may be attached as at 124 to the upper end of bracket 118 and then may extend rearwardly interiorly of the boom to loop about pulley 126 rotatably mounted adjacent the inner end of the outer boom section 32. From pulley 126, the cable may extend forwardly to be looped about aforementioned pulley 108 rotatably mounted on carriage mechanism 84. From pulley or sheave 108, the cable may then extend rearwardly to be looped in nonslippable relation about pulley 128 rotatably mounted on bracket 130 adjacent the pivoted end of the inner boom section 30.

From pulley 128, the cable 122 may then extend forwardly to be looped about aforementioned larger pulley 110 rotatably mounted on the carriage mechanism 84 in alignment with the aforementioned pulley 108. From pulley 110, the cable may extend rearwardly to be looped about pulley 130 rotatably mounted on the inner end of outer boom section 32 preferably in alignment with the aforementioned pulley 126. From pulley 130, the cable means may extend forwardly to be attached as at 132 to the lower end of the bracket 118. The other brackets 118*a*, 118*b* associated with the respective control lever 116*b* and 116*c* may also have cable means associated therewith and looped about pulleys in a similar manner as aforediscussed in connection with bracket 118. Such pulley and cable means have been designated by similar reference numbers as that for bracket 118 except that the prefix prime and double prime have been respectively applied thereto.

Each of the cable means 122, 122′, 122″ may be attached as by means of a link 134 (FIG. 5) to the axially movable spool 136, 136′, 136″ of the respective section of the distributing valve 40, for controlling the flow of fluid to the respective motor unit. For instance, cable 122 and associated lever 116*a* may be used to control the extension motor unit 38, while cable 122′ and associated control lever 116*b* may be used to control the elevation cylinder 36, while cable 122″ and associated control lever 116*c* may be used to control the rotation motor unit 20. Each of links 134 may be pivoted as at 138 to its respective spool, and also pivoted to a link 140 which in turn is pivoted as at 142 to the valve body.

Each of the pulleys 128, 128′ and 128″ may also be provided with a control lever 144, 144′ and 144″ operably connected to the respective pulley, for actuating the pulley and its associated cable, from a position adjacent the pivoted end 18 of the tower.

Each of the cables 122, 122′, 122″, preferably has insulating means such as fiberglass insulators 146 (FIGS. 5B, 12) inserted in the cable lines, to effectively insulate the control levers 116*a*, 116*b*, 116*c* from ground.

There also may be provided a deadman lever 148 (FIGS. 4B, 5B) pivoted on shaft 120, and operatively coupled to link 150 which is pivoted on shaft 152 supported on the outer boom section 32. Link 150 is coupled as by means of a rod 154 which includes insulator 154*a*, to switch mechanism 156 mounted on the tower section 32. There is preferably provided spring means 158 for normally urging the switch 156*a* into closed position but lever 148 is detented so as to ordinarily maintain the switch 156*a* in open condition. However, pivoting of the deadman lever 148 by a workman in bucket 34 will cause closing of switch 156*a*.

Upon closing of switch 156*a*, a conventional solenoid valve 159 (FIG. 10) is automatically operated directing the flow of fluid from line 48 back to reservoir R instead of to fluid line 50, in which event, actuation of the control levers 116*a*, 116*b*, 116*c*, will have no effect upon the respective motor unit 20, 36 and 38. Accordingly, the deadman lever is a safety feature which may be provided so that the workmen in the bucket 34 may prevent actuation of any of the motor units 20, 36 and 38 from the bucket upon pivoting of the deadman lever 148 and actuation of switch 156*a*, thus automatically deenergizing the entire control valve 40 and associated hydraulic circuit. Switch mechanism 156 may also include switches 156*b* (FIGS. 4B and 5B) which may be manually operated by rotatable knobs 161 for such functions as starting and stopping of the engine of the vehicle, control of signal devices, such as a buzzer etc. Such knobs 161 are positioned for actuation from the bucket 34, and are preferably insulated from ground in a similar manner as control levers 116*a*, 116*b*, 116*c* and 148.

The electrical line 159*a* (FIG. 5B) from switch mechanism 156 may pass down through the boom sections, through aforementioned tube 114 on the movable carriage 84, through opening 160 in the bottom of inner boom section 30, around guides 162 (FIG. 2) on superstructure frame 14, to be automatically reeved by spring loaded reel 164 (FIG. 2) mounted on frame 14, thus providing for extension and retraction of the electrical line 159*a* during extension and retraction of the boom.

The aforementioned leveling cylinder 62 may be pivotally connected as at 166 to a lever 168 (FIGS. 8 and 9) which is secured to the sheave 80. In the unactuated position of solenoid valve 52, or in other words in the position thereof wherein its distributing ports 52*b*, 52*c* are closed, the holding valves 54 and 56 are deactuated and the hydraulic circuitry of the leveling cylinder is locked. Thus assuming that the bucket 34 is in level condition with respect to ground in the lowered condition of the tower boom, as the boom is raised about its pivot 18 by actuation of motor unit 36, rotatable sheave 80 is maintained in a stationary position due to the hydraulically locked condition of cylinder 62, and the lower strand of cable 88 commences to wrap around sheave 80 as the upper strand of cable 88 unwinds. The reverse action takes place on sheave 78 coupled to the bucket 34, and thus the bottom strand of cable 88 unwinds as the top strand winds on the sheave 78, with the result that sheave 78 and attached shaft 76 rotate in a clockwise direction (with reference to FIGS. 9B and 11) thus maintaining the attached bucket 34 level.

Downward movement of the boom about its pivot 18 reverses the aforedescribed action, with the sheave 78 and attached shaft 76 rotating in a counterclockwise direction.

It will be seen therefore that the bucket 34 may be automatically retained in a level, stable condition during angling movement of the boom in a generally vertical plane about pivot 18. Actuation of switch 53 (FIG. 10) will actuate solenoid valve 52, as aforediscussed, to apply pressurized fluid to one or the other of distributing ports 52*b*, 52*c* of valve 52, to thus actuate holding valves 54, 56 and associated motor unit 62, thereby rotating pulley 80 about shaft 18 and causing actuation of cable 88, to swing the bucket 34 into any desired position or into a parallel relation with the boom, for instance for storage purposes. An adequate holding valve (54 and 56) has been found to be one manufactured by the Sarasota Precision Products Inc. of Sarasota, Florida, and identified as a No. 2572–3–3–2 valve.

From the foregoing description and accompanying drawings it will be seen that the invention provides a novel extendible aerial tower which includes control mechanism mounted on the tower and including control lines extending along the tower boom, and a pilot control unit mounted in conjunction with the work platform structure of the tower, and a work platform leveling system extending along the tower for maintaining the work platform level and stable irrespective of angling movement of the tower, and wherein the control system and the platform leveling system include compensating means for compensating for the extension and retraction of the control system and the platform leveling system during extension and retraction of the tower.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

We claim:

1. In an aerial tower comprising, a movable boom, a work platform rotatably supported on said boom, said boom being swingable in a generally vertical plane about a generally horizontal axis, motor means to swing said boom in said vertical plane, rotatable means operably connecting said platform to said boom in rotatating engagement, sheave means located on said boom towards said horizontal axis and adapted for selective non-rotation, compensating means mounted on said boom between said rotatable means and said sheave means and including shiftable carriage means disposed interiorly of the boom, flexible line means operably connected to said rotatable means, to said carriage means and to said sheave whereby said carriage means, said rotatable means and said sheave means coact to maintain said work platform level as said boom swings in said vertical plane.

2. An aerial tower in accordance with claim 1, wherein said carriage means has compensating pulley means disposed laterally of a plane passing through the axes of said sheave means and said rotatable means, whereby the shifting of said carriage means coacts with said rotatable means to cause said line means to wind about said sheave means as said rotatable means rotates as said boom swings in said vertical plane thereby maintaining said line means continually taut.

3. An aerial tower in accordance with claim 1 including, locking means adapted for operable locking coaction with said sheave means to selectively hold the latter against rotational movement.

4. An aerial tower in accordance with claim 3 wherein, said sheave means is rotatably mounted on said boom, and said locking means includes fluid motor means, lever means operatively connected adjacent one end to said sheave means and adjacent the other end to said fluid motor means, and valve means for selectively actuating and locking said fluid motor means, whereby actuation of said fluid motor means in one direction causes rotation of said sheave means and actuation of said fluid motor means in the opposite direction operates to lock said sheave means against rotation.

5. An aerial tower according to claim 1 wherein said boom includes a hollow inner boom section and a hollow outer section adapted for lengthwise movement relative to one another, means for moving said outer boom section lengthwise relative to said inner boom section, said rotatable means being mounted on said outer boom section, said sheave means being mounted on said inner boom section, said compensating means being shiftable interiorly of the boom and coacting between the boom and the flexible line means for automatically maintaining the flexible line means taut and permitting extension and retraction of the line means during extension and retraction of the boom.

6. An aerial tower in accordance with claim 1, wherein said line means includes electrical insulating means thereon for electrically insulating said work platform from the ground.

7. An aerial tower in accordance with claim 1, including track means on said boom for guiding the movement of said carriage means lengthwise of said boom.

8. An aerial tower according to claim 9 wherein said leveling system includes rotatable means on which the platform is rotatably mounted adjacent the distal end of the outer boom section, a selectively stationary sheave means mounted on said inner boom section, said flexible line means coacting with said sheave means, said rotatable means and said compensating means to maintain said platform level.

9. In an aerial tower including an extensible boom assembly comprising a plurality of boom sections adapted for lengthwise movement relative to one another for selectively changing the length of the boom assembly, said boom assembly beng pivoted on a support for swinging movement in a generally vertical plane and about a substantially horizontal axis, and being mounted for rotary movement about a generally vertical axis, fluid powered motor means for selectively extending, pivoting and rotating said boom assembly, a work platform pivotally mounted on the outermost boom section for supporting workmen therein, a control system including flexible line means extending lengthwise along the boom assembly, a pilot control unit mounted on said boom assembly in accessible relation to said work platform and operatively connected to said line means, distributing valve means operatively connected to said line means for controlling the application of pressurized fluid to said motor means, and compensating means coacting between said boom sections and said flexible line means providing for extension and retraction of the flexible line means during extension and retraction of the boom assembly while maintaining said line means generally taut, said compensating means comprising a carriage mechanism mounted on said boom assembly and shiftable lengthwise thereof and pulley means mounted on said boom sections, said carriage mechanism and said pulley means coacting with said flexible line means for extending and retracting the line means during extension and retraction of the boom assembly, and track means on said boom assembly for guiding the movement of said carriage mechanism lengthwise of said boom assembly, other flexible line means coacting between said boom sections and said carriage mechanism for moving said carriage mechanism in a direction toward the distal end of said boom assembly during extension of said boom assembly, the first mentioned line means being operative to move said carriage mechanism rearwardly with respect to said boom assembly during retraction of said boom assembly, and a platform leveling system on said boom assembly coacting with said work platform for maintaining the latter level and stable during said vertical swinging movement of said boom assembly, said platform leveling system including flexible line means coacting with said boom sections and said carriage mechanism for extension and retraction of said line means of said leveling system during extension and retraction of said boom assembly, said platform leveling system including a reciprocal, double acting motor unit operatively connected to said leveling system line means, said motor unit being adapted to acutate the last mentioned line means, for selectively pivoting said work platform, and valve means coupled to said motor unit for locking the same in selected position.

10. An aerial tower in accordance with claim 9, wherein said motor unit is operatively connected to said last mentioned line means by a pulley rotatably mounted on said boom assembly and about which said last mentioned line means is reeved, an arm secured to said pulley and projecting generally radially therefrom, and means pivotally connecting one end of said motor unit to said arm, the other end of said motor unit being pivotally connected to a support.

11. An aerial tower in accordance with claim 10, wherein said line means include electrical insulating means therein for electrically insulating said control and said leveling systems from ground.

12. In an aerial tower including an extensible boom assembly comprising an inner boom section and an outer boom section, said outer boom section being movable lengthwise relative to said inner boom section, a double acting fluid powered motor means secured to said inner and outer boom sections for moving said outer boom section lengthwise relative to said inner boom section, a work platform pivotally mounted on said outer boom section for supporting workmen therein, said boom assembly being pivoted on a support for swinging movement in a generally vertical plane, double acting fluid powered motor means coacting with said boom assembly for angling said boom assembly in said vertical plane, means mounting said boom assembly on said support for rotational movement about a generally vertical axis, fluid powered motor means for rotating said boom assembly about said generally vertical axis, a control system including flexible line means extending lengthwise along the boom assembly, valve means on said boom assembly for controlling the application of fluid pressure to said motor means, and a pilot control unit mounted on said boom assembly in accessible relation to said work platform and coupled to said valve means by said line means for enabling control of said motor means from said work platform, and compensating means including a shiftable carriage mechnism mounted on said boom assembly and coacting with said flexible line means for providing for extension and retraction of the flexible line means during extension and retraction of the boom assembly, and a platform leveling system comprising flexible line means coacting between said work platform and said support for maintaining the work platform level during swinging movement of the boom assembly in said vertical plane, said leveling system including a reciprocal fluid powered motor unit mounted on said support and coacting with said line means of said leveling system, for maintaining the platform stable during pivotal movement of said boom assembly in said vertical plane.

13. In an aerial tower including an extensible boom assembly comprising an inner boom section and an outer boom section, said outer boom section being movable lengthwise relative to said inner boom section, a double acting fluid powered motor means secured to said inner and outer boom sections for moving said outer boom section lengthwise relative to said inner boom section, a work platform pivotally mounted on said outer boom section for supporting workmen therein, said boom assembly being pivoted on a support for swinging movement in a generally vertical plane, double acting fluid powered motor means coacting with said boom assembly for angling said boom assembly in said vertical plane, means mounting said boom assembly on said support for rotational movement about a generally vertical axis, fluid powered motor means for rotating said boom assembly about said generally vertical axis, a control system including flexible line means extending lengthwise along the boom assembly, valve means on said boom assembly for controlling the application of fluid pressure to said motor means, and a pilot control unit mounted on said boom assembly in accessible relation to said work platform and coupled to said valve means by said line means for enabling control of said motor means from said work platform, and compensating means including a shiftable carriage mechanism mounted on said boom assembly and coacting with said flexible line means for providing for extension and retraction of the flexible line means during extension and retraction of the boom assembly, including control means on said boom assembly adjacent the pivotal connection of said boom assembly to said support for actuating said valve means.

References Cited by the Examiner

UNITED STATES PATENTS

| | | | |
|---|---|---|---|
| 1,506,277 | 8/1924 | Strauss | 182—2 |
| 2,881,030 | 4/1959 | Troche | 182—2 |
| 2,905,262 | 9/1959 | Zwight | 182—2 |
| 3,136,385 | 6/1964 | Eitel | 182—2 |
| 3,169,602 | 2/1965 | Myers | 182—46 |

REINALDO P. MACHADO, *Primary Examiner.*